United States Patent
Boyapalle et al.

(10) Patent No.: US 11,350,307 B2
(45) Date of Patent: May 31, 2022

(54) SYSTEMS AND METHODS OF TRANSMITTING DATA OVER A COMMUNICATION NETWORK USING QUALITY OF SERVICE TAGGING

(71) Applicant: Dell Products, LP, Round Rock, TX (US)

(72) Inventors: Anantha K. Boyapalle, Cedar Park, TX (US); Liam B. Quinn, Austin, TX (US); Kamal J. Koshy, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/891,904

(22) Filed: Jun. 3, 2020

(65) Prior Publication Data
US 2021/0385683 A1    Dec. 9, 2021

(51) Int. Cl.
*G06F 11/00* (2006.01)
*H04W 28/02* (2009.01)
*H04W 72/10* (2009.01)

(52) U.S. Cl.
CPC ....... *H04W 28/0268* (2013.01); *H04W 72/10* (2013.01)

(58) Field of Classification Search
CPC ...... H04L 47/10; H04L 47/2441; H04L 47/30
USPC .............................................. 370/235, 235.1
See application file for complete search history.

(56) References Cited

U.S. PATENT DOCUMENTS

| | | | | |
|---|---|---|---|---|
| 10,716,075 | B1* | 7/2020 | Choi | H04B 17/318 |
| 2018/0167825 | A1* | 6/2018 | Egner | H04W 28/08 |
| 2018/0167948 | A1* | 6/2018 | Egner | H04W 76/16 |
| 2018/0176818 | A1* | 6/2018 | Parron | H04W 28/0278 |
| 2020/0092752 | A1* | 3/2020 | Henry | H04L 47/14 |

(Continued)

*Primary Examiner* — Chuong T Ho
(74) *Attorney, Agent, or Firm* — Prol Intellectual Property Law, PLLC; H. Kenneth Prol

(57) ABSTRACT

An information handling system may include a processor; a memory; an application monitoring module to, upon execution by the processor, receive data descriptive of the type of data traffic to be transmitted across a wireless communication network by any of a plurality of applications being executed on the information handling system; spectrum query module to, upon execution by the processor, determine which of a plurality of wireless communication spectrums are available to communicatively couple the information handling system to a backend server for transmission of the data to be transmitted by each of the applications; and a differentiated services code point (DSCP) filtering module to: rank a plurality of data types of the applications being executed by the processor based on prioritization criteria associated with data to be transmitted by each of the application; assign a wireless communication spectrum to a type of data associated with any given application being executed by the processor according to the prioritization criteria and rank of the given application wherein the plurality of wireless communication spectrums are separated into individual network slices to achieve a quality of service (QoS) commensurate with the prioritization criteria; and a network interface device for communicating the type of data on corresponding wireless communication spectrums for the individual network slices.

20 Claims, 5 Drawing Sheets

(56) References Cited

U.S. PATENT DOCUMENTS

| | | | |
|---|---|---|---|
| 2020/0184014 A1* | 6/2020 | Ahaus | G06F 40/30 |
| 2021/0042129 A1* | 2/2021 | Grant | G06N 20/00 |
| 2021/0149776 A1* | 5/2021 | Sethi | G06Q 10/20 |

* cited by examiner

SYSTEMS AND METHODS OF TRANSMITTING DATA OVER A COMMUNICATION NETWORK USING QUALITY OF SERVICE TAGGING

FIELD OF THE DISCLOSURE

The present disclosure generally relates to data transmission over a wireless communication network. The present disclosure more specifically relates to data transmission over a wireless communication network based on queried spectrum data to manage quality of service (QoS) of data transmission or reception for a particular application executed on an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include systems and method for connecting the information handling system to a communication channel that will increase the quality of service (QoS) across a communication network.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
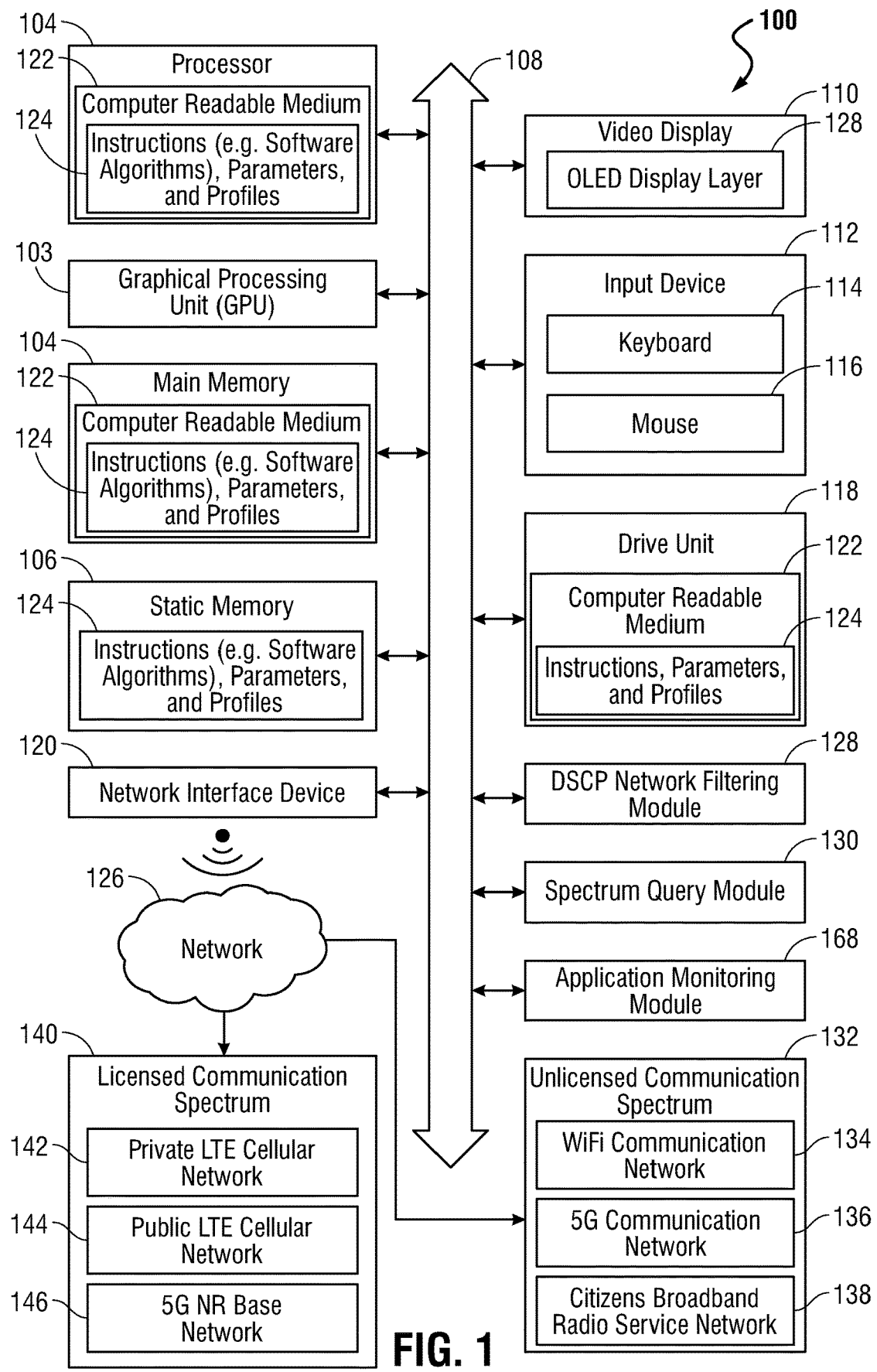
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for an information handling system that includes a processor, a memory, and an application monitoring module to, upon execution by the processor, rank a plurality of applications being executed by the processor based on prioritization criteria associated with data to be transmitted by each of the applications. The information handling system may further include a spectrum query module to, upon execution by the processor, determine which of a plurality of wireless communication spectrums are available to communicatively couple the information handling system to a backend server for transmission of the data to be transmitted by each of the applications. The information handling system may also include a differentiated services code point (DSCP) filtering module to assign a wireless communication spectrum to data associated with any given application being executed by the processor according to the prioritization criteria and rank of the given application. This may provide for allocation of individual wireless communication spectrums to particular types of application data communications by one or more applications operating on the information handling system.

In addition, the present disclosure provides for prioritization criteria that includes data descriptive of the level of protection to be applied to the data being transmitted by each of the applications. As different types of data are to be transmitted by the information handling system, the type of data and the security of the data may be considered and prioritization data may be created that indicates that specific types of data are transmitted using a wireless spectrum that may secure the data being transmitted. In an embodiment, a licensed wireless spectrum may be used to facilitate the secure transmission of data. In some embodiments, the plurality of wireless communication spectrums may be separated into individual network slices to achieve a quality of service (QoS) commensurate with the prioritization criteria. Different network slices may be used by different types of data being transmitted according to some embodiments. In some embodiments, low priority data may be transmitted across an unlicensed wireless spectrum. In these embodiments, the low priority data may be assigned, by the DSCP filtering module, to this unlicensed wireless spectrum. In an embodiment, high priority data may be transmitted across a licensed wireless spectrum. In these embodiments, the high priority data may be assigned, by the DSCP filtering module, to this licensed wireless spectrum. The assignment of the spectrum to any given data is accomplished by the DSCP filtering module that creates a DSCP header designating the assignment of the wireless communication spectrum to the data associated with any of the given applications being executed by the processor.

Embodiments of the present disclosure provide for an information handling system that utilizes prioritization criteria that includes security level data descriptive of the level of security to be applied to the data being transmitted by each of the applications. Because different data may include personal or private data, the wireless spectrum used to transmit this data may be chosen based on the ability of the chosen spectrum to secure the data which may be one factor of multiple factors in assigning priority for selection of a wireless communication spectrum.

Embodiments of the present disclosure provide for an information handling system that is communicatively coupled to a virtual network module via the spectrum query module. In these embodiments, the spectrum query module communicates with the virtual server networking module to manage the transmission of the data throughout a computer network the information handling system is communicatively coupled to.

Embodiments of the present disclosure provide for a method of transmitting data across a computer network that includes, with a processor, executing an application monitoring module to rank a plurality of applications being executed by the processor based on prioritization criteria associated with data to be transmitted by each of the applications; with the processor, executing a spectrum query module to determine which of a plurality of wireless communication spectrums are available to communicatively couple the information handling system to a backend server for transmission of the data to be transmitted by each of the applications; with the processor, executing a differentiated services code point (DSCP) filtering module to assign a wireless communication spectrum to data associated with any given application being executed by the processor according to the prioritization criteria and rank of the given application or data types communicated by particular applications; and with the processor, transmitting data from the information handling system to a backend server via the assigned wireless communication spectrum. The embodiments described herein implements hardware, software, or a combination thereof that uses RF band-specific information when allocating DSCP tags placed within a header during transmission of the data to a backend server across the communication network described herein. The header may also include quality of service (QoS) tags that indicate which among a plurality of spectrums may be used to transmit the data across the communication network. As an example embodiment, data associated with video traffic may be allocated to a licensed spectrum radio interface that is, compared to an unlicensed spectrum, less susceptible to interference or congestion issues from lack of bandwidth, as well as more secure and less accessible by a third-party. In some example embodiments, best effort traffic with lower latency requirements and the data associated therewith may be allocated to a RF band spectrum that is unlicensed. An unlicensed RF band spectrum may be used for less priority traffic and QoS tagging may be completed based on that information. As described herein, the prioritization of data may be generated using a plurality of criteria depending on data type transmission reception needs or also depending on security considerations in various embodiments. These prioritization factors may be reflected in the DSCP header created by the DSCP filtering module.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer (e.g., endpoint device) in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices 112, such as a keyboard 114, a mouse 116, microphone, speaker, a video/graphic display, or any combination thereof. The information handling system 100 can also include one or more buses operable to transmit communications between the various hardware components. Portions of an information handling system 100 may themselves be considered information handling systems 100.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102, graphical processing unit (GPU) 103, control logic or some combination of the same. Any of the processing resources may operate to execute code that is either firmware or software code. Moreover, the information handling system 100 can include memory such as main memory 104, static memory 106, and drive unit 116 (volatile (e.g. random-access memory, etc.), nonvolatile (read-only memory, flash memory etc.) or any combination thereof) having computer readable medium 122 for storing instructions 124. Code instructions 124 may include operating system instructions, various application instructions, and code modules such as a differentiated service code point (DSCP) filtering module 128, a spectrum query module 130, or an application monitoring module 168. The information handling system 100 can also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display which may operate via the GPU 103. Additionally, the information handling system 100 may include an input/output device 112, such as a cursor control device (e.g., mouse 114, touchpad, or gesture or touch screen input, and a keyboard 114 an audio signal device such as a speaker or microphone, or other signal device such as a camera, infrared (IR) camera, webcam, virtual reality (VR) device, or the like).

The network interface device 120, such as a wireless adapter, can provide connectivity to a network 126, e.g., a wide area network (WAN), a local area network (LAN), wireless local area network (WLAN), a wireless personal area network (WPAN), a wireless wide area network (WWAN), or other networks. Connectivity may be via wired or wireless connection. The wireless adapter may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links.

The network interface device 120 may connect to any combination of wireless connections including 2G, 2.5G, 3G, 4G, 5G or the like from one or more service providers or as part of an unlicensed spectrum access. Utilization of radiofrequency communication bands according to several example embodiments of the present disclosure may include bands used with the WLAN standards and WWAN carriers, which may operate in both licensed communication spectrum 140 and unlicensed communication spectrums 132. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. Other WWAN carrier bands, such as various 5G spectrum band may operate in frequency range (FR) 1 (sub-6 GHz) or FR2 (>5 GHz) bands according to embodiments herein. As described herein, the spectrum query module 130 may determine which of the frequency bands (e.g., RF frequency bands) are available to the information handling system 100, either licensed or unlicensed, to transmit data across a communication network and to a backend server. The backend server may include any type of server the information handling system 100 is attempting to communicate with for any purpose.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 126 can communicate voice, video or other data over the network 126. Further, the instructions 124 may be transmitted or received over the network 126 via the network interface device or wireless adapter 120.

The information handling system 100 can include a set of instructions 124 that can be executed to cause the computer system to perform any one or more of the methods or computer-based functions disclosed herein. For example, instructions 124 may execute the DSCP filtering module 128, the spectrum query module 130, the application monitoring module 168, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116 and the DSCP filtering module 128, the spectrum query module 130, and the application monitoring module 168 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 stored on the computer readable medium 122. The disk drive unit 116 and static memory 106 may also contain space for data storage. Further, the instructions 124 may embody one or more of the methods or logic as described herein. For example, instructions relating to the DSCP filtering module 128, the spectrum query module 130, and the application monitoring module 168, software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the DSCP filtering module 128, spectrum query module 130, and application monitoring module 168, may be executed locally or remotely. The main memory 104 and the processor 102 also may include computer-readable media.

Main memory 104 may contain computer-readable medium 122, such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The DSCP filtering module 128, the spectrum query module 130, and the application monitoring module 168 may be stored in static memory 106, or the drive unit 116 on a computer-readable medium 122 such as a flash memory or magnetic disk in an example embodiment. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium 122 can include a solid-state memory such as a memory card or other package that houses one or more non-volatile read-only memories. Further, the computer-readable medium 122 can be a random-access memory or other volatile re-writable memory in other embodiments.

Additionally, the computer-readable medium 122 can include a magneto-optical or optical medium, such as a disk or tapes or other storage device to store information received via carrier wave signals such as a signal communicated over a transmission medium. Furthermore, a computer readable medium 122 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium 122 or a distribution medium and other equivalents and successor media, in which data or instructions may be stored.

As described, the information handling system 100 may include an application monitoring module 168 that may be operably connected to the bus 108. The application monitoring module 168 computer readable medium 122 may contain space for data storage. The application monitoring module 168 may, according to the present description, perform tasks related to receiving and classifying data descriptive of the type of data traffic to be transmitted across a communication network by any of a plurality of applications being executed on the information handling system. In some embodiments, the information handling system 100 may include computer executable code that define a plurality of different executable applications. These applications include any type of word processing application, data (e.g., video and/or audio data) streaming application, a videoconferencing application, a spreadsheet application, an email application, a browser application, a file hosting application, a gaming application, a desktop publishing application, and an audio/video application. Examples presented herein may include any application from any type of developers and these specific developer examples of applications are not meant to limit the principles described herein.

During operation, the application monitoring module 168 may receive data related to any of the applications to be and are being executed by the processor 102 of the information handling system 100. This data related to the applications may describe the data being processed and, in context of the present application, transmitted across the communication network described herein. By way of example, during operation, the application monitoring module 168 may receive data descriptive of the data being transmitted by a videoconferencing application such as Zoom® produced by Zoom Video Communications Inc. of San Jose, Calif., USA; Skype® developed by Skype Technologies of Luxembourg City, Luxembourg and Palo Alto, Calif.; and Microsoft Teams® developed by Microsoft Corporation of Redmond, Wash., USA. Each of these videoconferencing applications may transmit audio and/or video data across a communication network and to a backend server. Because of the high bandwidth used to transmit this data, the priority of this type of data may be given medium or even high priority thereby prescribing a RF communication spectrum to this data that can transmit such amounts of data in some embodiments. For example, such video data may be classified as high priority such that it may be directed toward as a 5G related spectrum or other high-bandwidth options.

In addition to data descriptive of the type of data transmitted by any of the applications to be or currently executed on the information handling system 100, the application monitoring module 168 may receive data descriptive of the privacy of the data being transmitted while ranking a plurality of applications being executed. With the example of the videoconferencing application, the data being transmitted may be include video and/or audio data of users potentially discussing private or corporate matters. In this example, the RF spectrum used to transmit the data from the applications, whether unlicensed communication spectrum 132 or licensed communication spectrum 140, may be selected based on the capabilities of that RF spectrum to securely transfer that data. The prioritization criteria associated with data to be transmitted by each of the applications may be any type of criteria that may be transmitted to the DSCP network filtering module 128 to rank the plurality of applications being executed by the processor 102 in order to ensure a level of QoS for each application. Such security sensitivity factors may also be used to describe application data ranking or weighted ranking for selection of a wireless communication spectrum.

In another specific embodiment, any given application being executed by the processor 102 may have various different types of data that may be transmitted across the communication network. Such an application may include a gaming application. Gaming applications may, during execution of the computer readable program code associated therewith, create video data, audio data, synching data, and input-output (I/O) data. Each of these different types of data may be transmitted across the communication network using a different RF spectrum to, for example, a backend server. In this embodiment, the different RF spectrums may be separated into different network slices. As described herein, by slicing the communication network into multiple logical and independent virtual networks configurable to meet specific QoS requirements associated with specific types of data, different types of data may be routed to the backend server utilizing various types of hardware to increase the QoS transmission of the various types of data. In this embodiment, the data produced and to be transmitted by the gaming application over the communication network may be bifurcated or trifurcated into multiple slices according to data priority assignment or ranking of data type or security requirements. For example, video data may be transmitted using once slice, audio and synchronization data transmitted on another network slice, and I/O data transmitted using a third network slice. This may also increase bandwidth access.

In an embodiment, the application monitoring module 168 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Driver software, firmware, controllers and the like may communicate with applications on the information handling system 100.

As described, the information handling system 100 may include a spectrum query module 130 that may be operably connected to the bus 108. The spectrum query module 130 computer readable medium 122 may contain space for data storage. The spectrum query module 130 may, according to the present description, perform tasks related to determining which of a plurality of wireless communication spectrums are available to communicatively couple the information handling system to a backend server for transmission of the data to be transmitted by each of the applications. In an embodiment described herein, the spectrum query module 130 may receive data from the DSCP filtering module 128 indicating which QoS criteria to discover in the various RF spectrums available to the information handling system 100 to transmit data. In an embodiment, the spectrum query module 130 may send, to the DSCP network filtering module 128, data descriptive of the available RF spectrums across the sliced network available to transmit any type of data (e.g., video, audio, email data among other types of data). In an embodiment, the spectrum query module 130 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory.

As described, the information handling system 100 may include a DSCP filtering module 128 that may be operably connected to the bus 108. The DSCP filtering module 128 may include computer readable medium 122 that contains space for data storage. The DSCP filtering module 128 may, according to the present description, perform tasks related to ranking the plurality of applications being executed by the processor based on prioritization criteria associated with data to be transmitted by each of the application and assigning a wireless communication spectrum to data associated with any given application being executed by the processor according to the prioritization criteria and rank of the given application.

As described herein, the DSCP filtering module 128 receives data from the application monitoring module 168 that is descriptive of the type of data traffic to be transmitted across a communication network by any of a plurality of applications being executed on the information handling system 100. The data may be ranked by the DSCP filtering module 128 based on the QoS to be assigned to those specific types of data from the individual applications to be transmitted. For example, the data being transmitted may require certain levels of quality of service that include acceptable levels of packet loss, bit rates, throughput, acceptable levels of transmission delays, availability of the RF spectrum and bandwidth, acceptable levels of data security, and acceptable levels of jitter, among others. Some data, such as that produced by an email application can be relegated to those spectrums and network slices that may have an adequate level QoS to send email as compared that compared to data associated with a gaming application or a videoconferencing application that may require higher levels of bandwidth, less transmission delays, and less packet loss. In an embodiment, the data provided to the DSCP filtering module 128 from the application monitoring module 168 may be used to create QoS prioritization criteria by the DSCP filtering module 128. This quality of service (QoS) prioritization criteria may be used to rank the plurality of applications being executed by the processor 102 by the DSCP filtering module 128.

The DSCP filtering module 128 may also assign a wireless communication spectrum to types of data associated with any given application being executed by the processor according to the prioritization criteria and rank of the given application. The assignment of the communication spectrum (and corresponding network slice) may be accomplished by the DSCP filtering module 128 adding a DSCP tag to the header associated with the type of data being transmitted. The assignment of the communication spectrum (and commensurate network slices) may also depend on those communication spectrums identified by the spectrum query module 130 as being available to the information handling system.

After receiving the spectrum data from the spectrum query module 130, the DSCP filtering module 128 may rank the applications. The DSCP network filtering module 228 may rank the plurality of applications being executed based on prioritization criteria described herein. In an embodiment, the prioritization data may be predefined by an IT manager. The DSCP filtering module 128 may then assign one or more wireless communication channels with a preselected spectrum type as described herein by referring to classification criteria, spectrum mapping, and DSCP tagging priority data maintained, for example, on a look-up table maintained by the DSCP filtering module 128. This look-up table may provide data descriptive of how the DSCP filtering module 128 is to rank the applications and assign that data associated with those applications to a RF spectrum. Again, in an embodiment, the classification criteria may be defined by an IT manager and may identify classes of data that may be utilized by those applications being executed on the information handling system. The spectrum mapping may relate to a specific licensed or unlicensed RF spectrum is available to transmit a certain type of data. DSCP tagging priority data may also be defined by a network administrator prior to execution of the DSCP filtering module 128. The DSCP tagging priority data may include values of the priority of data based on numerous factors such as security, bandwidth needs, and latency needs, among others. An example data classification according to one embodiment, including spectrum mapping, and tagging of data is represented in Table 1.

TABLE 1

| Classification of Data | Spectrum mapping | DSCP Tagging Priority Data |
| --- | --- | --- |
| Video Data | Licensed or Unlicensed | M (Medium (0.02 value put in DSCP header for this "medium" priority) |
| VOIP Data | Licensed | H (High) (0.9234341487 example value put in the DSCP header for this priority) |
| Background Data | Licensed or Unlicensed | L (Low) |
| Best Effort Data | Licensed or Unlicensed | L |
| Browser (email) data | Licensed | H |
| Browser (news/other) data | Unlicensed | L |

Although Table 1 shows a high, low, and medium DSCP tagging priority data assigned to any specific type of data, the present specification contemplates that this DSCP tagging priority data may be different based on a mode of operation across the communication network any given IT administrator is attempting to achieve. Additionally, the DSCP tagging priority data includes a value given or associated with any of the high, low, or medium tags. This value may be used by the DSCP filtering module 128 to place those values into the header of the data packet before transmission of the data packet across the communication network. However, the system and hardware in the communication network may use any value to designate a high, low, or medium DSCP tagging priority and the present specification contemplates the use of any of these other values or indicators.

During operation of the information handling system 100, the user may launch any of the applications descried above. As each application, either executed in the background or via interfacing with the user interface, the application monitoring module 168 may accumulate data descriptive of the type of data traffic to be transmitted across a communication network by any of these applications. The application monitoring module 168 may interact with the DSCP filtering module 128 to classify the type of traffic to be sent by any of these given applications across the communication network. This classification allows the DSCP filtering module 128 to determine the relative QoS to be provided to the data from each of the individual applications being executed. As such, the DSCP filtering module 128 may also determine the priority of the data to be transmitted by the applications based on, for example, the data presented in the look-up table similar to that presented in Table 1. In an embodiment, the classification of the data may depend the applications that are active or anticipated to be active and data types from those applications, security factor of the data types, and the multiple available spectrums of wireless communication channels available to the information handling system 100 according to embodiments described herein.

The DSCP filtering module 128 of the information handling system 100 may also, at this time, get the spectrum information from the spectrum query module 130. In an example, the spectrum query module 130 may provide a list of licensed communication spectrums 140 and unlicensed communication spectrums 132 and network slices available to the information handling system 100 to transmit data across the communication network. By way of example of an unlicensed communication spectrum 132 may include those spectrums that do not require a private entity to obtain a license from a governmental agency in order to manage or otherwise transmit data across that spectrum. Example unlicensed spectrums may be associated with private or public Wi-Fi communication networks 134, 5G communication networks 136, WiGig communication networks, citizens broadband radio service (CBRS) network 138, and small cell WLAN communication networks. An unlicensed spectrum may frequently be on shared communication spectrums. Example RF frequency bands within the unlicensed spectrums may include 5 GHz frequency bands or 3.5 GHz conditional shared communication frequency bands under FCC Part 96. Wi-Fi ISM frequency bands that could be subject to future sharing under an unlicensed regime may include 2.4 GHz, 60 GHz, 900 MHz or similar bands as understood by those of skill in the art. Within a local portion of the communication network the information handling system 100 is communicatively coupled to, access points for Wi-Fi or WiGig as well as small cell WWAN connectivity may be available in emerging 5G technology. In contrast, a licensed frequency band may include those frequency bands regulated by a governmental agency under which a license may be obtained by a private entity in order to operate across. By way of example, a licensed communication spectrum 140 may include those spectrums associated with a public LTE communication network 144, private LTE communication network 142, 5G NR based network 146, citizens broadband radio service (CBRS), or any other communication network that is regulated by a governmental agency such as the Federal Communications Commission (FCC). Such licensed spectrum may require a subscription access to a wireless network service provider entity for example.

In an embodiment, the determination of whether an unlicensed spectrum is available at the location of the information handling system 100 may determine how the DSCP filtering module 128 tags the data from each executing application via the DSCP header. By way of example, where there is no unlicensed spectrum available, the DSCP filtering module 128 may include in the header of the data packet with a tag indicating that the data has an appropriate priority level based on the information presented in Table 1, for example. In an embodiment, where the type of data indicates that a low priority (e.g., lower than the 0.02 value assigned to medium priority data in Table 1) is to be assigned, the DSCP filtering module 128 may include a value within the header indicating the low priority of the data. In an embodiment, where the type of data indicates that a high priority (e.g., the 0.9234341478 value assigned to high priority data in Table 1) is to be assigned, the DSCP filtering module 128 may include a value within the header indicating the high priority of the data. At this point, the data may be transmitted over the communication network using a selected licensed spectrum such as a spectrum associated with an LTE communication protocol, for example. In an embodiment, the selected licensed spectrum may be selected based on a licensed wireless spectrum that facilitates a secure transmission of that data. Other considerations may be used to select the licensed wireless spectrum such as other QoS criteria descried herein.

In an embodiment, where an unlicensed spectrum is available at the location of the information handling system 100, the priority of the data may be addressed. For example, where the priority of the traffic is low (e.g., email, browser data, etc.), the DSCP filtering module 128 may add a tag to the DSCP header indicating that the data packet has a low priority and cause that data packet to be transmitted across the communication network using an unlicensed spectrum. However, if, according to Table 1 for example, the priority of the data traffic from any given application is indicated as being high or medium, the DSCP filtering module 128 may insert a relevant tag into the DSCP header and transfer that data over a licensed spectrum.

As the data is being transferred over the communication with an associated tag within the DSCP header created by the DSCP filtering module 128, the data may be relayed to a backend server that receives the input from the information handling system 100 and may provide output to the information handling system 100 depending on the data being sent. For example, the backend server may be associated with a videoconferencing application being executed on the information handling system 100. In this example, video/audio data may be simultaneously sent and received by the information handling system 100 over the network slice and at the RF spectrum that the DSCP filtering module 128 has indicated in the tag within the DSCP header. Thus, deeper network communication servers and network systems may track and monitor network slices and routes of DSCP labeled data streams for optimization of data connectivity to backend servers in some embodiments. In an embodiment, the DSCP filtering module 128 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
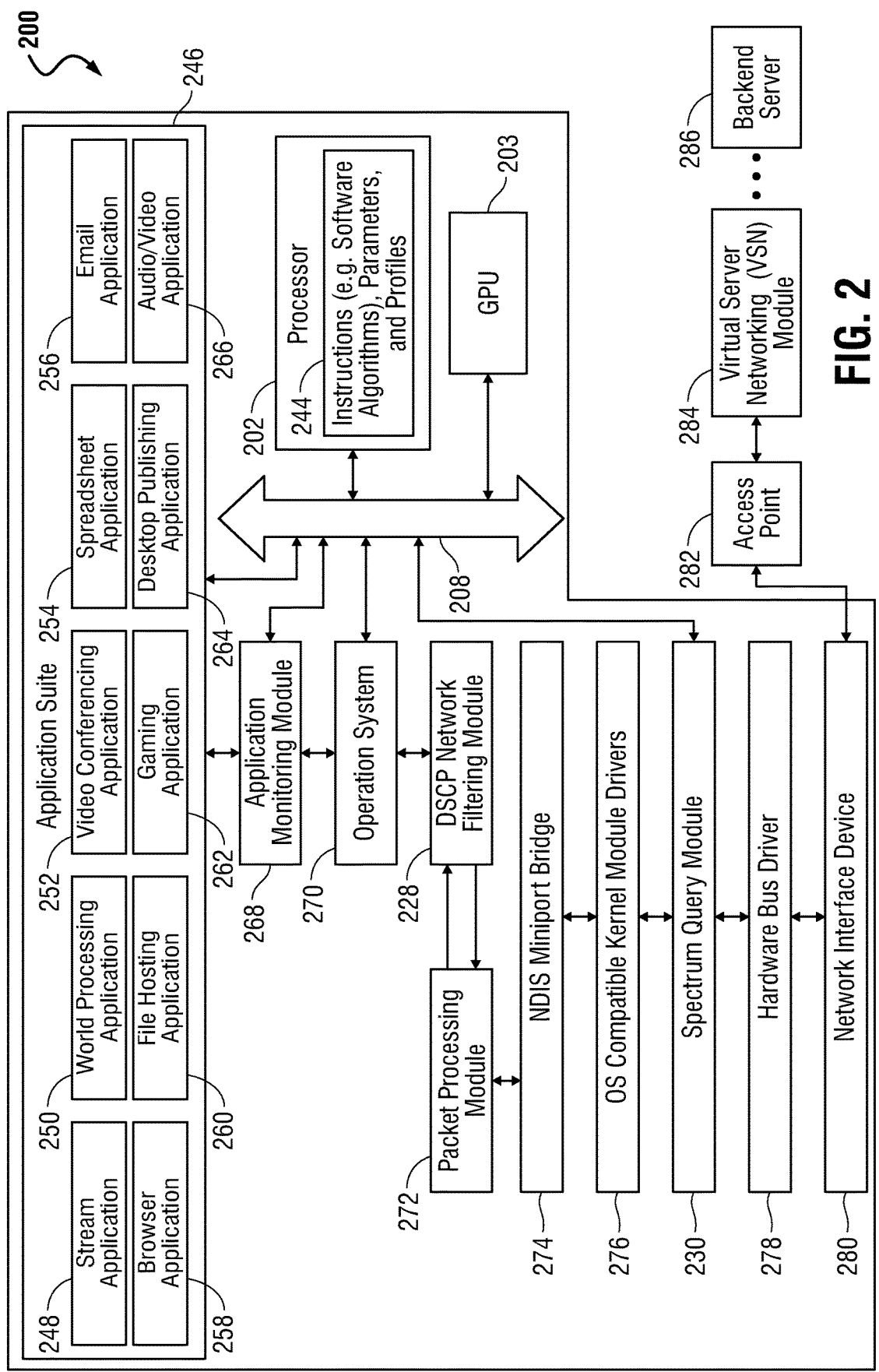
FIG. 2 is a block diagram illustrating an information handling system according to another embodiment of the present disclosure.

FIG. 2 is a block diagram illustrating an information handling system 200 according to another embodiment of the present disclosure. The information handling system 200 may include an application monitoring module 268, a DSCP network filtering module 228, and a spectrum query module 230 similar to that described in connection with FIG. 1. In the embodiment shown in FIG. 2, the information handling system 200 may be communicatively coupled to a backend server 286 via a virtual server networking module 284.

In this embodiment, the application monitoring module 268 may monitor the execution of any of the applications within an application suite 246. In an embodiment, an application suite may refer a group of applications that includes some or all executable applications present on the information handling system 200. Although some specific examples of applications are shown to form part of the application suite 246, the present specification contemplates that other types or specific applications may be included within the application suite 246 and the methods and systems described herein may be applied to other types of applications and their respective data without going beyond the scope of the principles described herein.

The information handling system 200 may include any form of computer readable medium that maintains computer readable and executable program code that defines the applications of the application suite 246. These applications in the application suite 246 may include a streaming application 248, a word processing application 250, a videoconferencing application 252, a spreadsheet application 254, an email application 256, a browser application 258, a file hosting application 260, a gaming application 262, a desktop publication application 264, an audio-video application 266, among other types of applications. By way of example, the streaming application 248 may include Netflix® video streaming developed by Netflix, Inc. of Scotts Valley Calif., USA; Hulu® developed by Hulu, LLC of Santa Monica Calif., USA; Prime Video® developed by Amazon Inc. of Seattle Wash., USA; and YouTube® developed by YouTube, LLC of San Bruno Calif., USA, among others. By way of example, the word processing application 250 may include Microsoft Word® developed by Microsoft of Redmond, Wash., USA; Wordpad® developed by Microsoft of Redmond, Wash., USA; and LibreOffice Writer® developed by The Development Foundation of Berlin Germany. By way of example, the videoconferencing application 252 may include Zoom® developed by Zoom Video Communications Inc. of San Jose, Calif., USA; Skype® developed by Skype Technologies of Luxembourg City, Luxembourg and Palo Alto, Calif.; and Microsoft Teams® developed by Microsoft Corporation of Redmond, Wash., USA. By way of example, the spreadsheet application 254 may include Microsoft Excel® developed by Microsoft Corporation of Redmond, Wash., USA. By way of example, an email application 256 may include computer-based Microsoft Outlook® developed by Microsoft Corporation of Redmond, Wash., USA and browser-based email applications such as Gmail® developed by Google, LLC of Mountain View Calif., USA, among others. By way of example, a file hosting application 260 may include Microsoft OneDrive® developed by Microsoft Corporation of Redmond, Wash., USA and DropBox® developed by Dropbox, Inc. of San Francisco, Calif., USA. By way of example, a gaming application 262 may include any myriad and numerous types of gaming applications that are executed on or at least partially by the processor 202 of the information handling system 200 and relays data to and from a backend server 286. By way of example, a desktop publication application 264 may include Microsoft Publisher® developed by Microsoft Corporation of Redmond, Wash., USA; Adobe InDesign® developed by Adobe Systems of Mountain View, Calif., USA; and QuarkXPress® developed by Quark, Inc. of Denver, Colo., USA. By way of example, an audio-video application may include any music or video streaming application that streams audio and video data to the information handling system 200 from the backend server 286. The present specification contemplates that these descriptive examples may be included within one or more of the categories of applications described.

Each of these types of applications may transmit data from the information handling system 200 and to some backend server 286 over a communication network. As described herein, this data may be routed over this communication network using a specific RF spectrum and network slice. As described herein, the RF spectrum and network slice may be selected by the DSCP network filtering module 228 based on prioritization criteria associated with the data to be transmitted by each of the applications mentioned above. The methods and systems described herein allows for a high level of QoS during transmission of data and execution of the applications within the application suite 246 described herein using both licensed and unlicensed RF spectrums. By relegating certain types of data to certain RF spectrums and network slices a high bandwidth application will be set to a high level of, for example, throughput while those applications transmitting sensitive data may transmit that data over a secure spectrum, for example.

During operation of the information handling system 200, an application monitoring module 268 may, upon execution by the processor 202, receive data descriptive of the type of data traffic to be transmitted across a communication network by any of a plurality of applications within the application suite 246 and being executed on the information handling system 200. This data descriptive of the type of data traffic may be relayed to the DSCP network filtering module 228 via the operating system (OS) 270 of the information handling system 200. The OS 270 may be any type of operating system such as Windows® developed by Microsoft Corporation of Redmond, Wash., USA. The OS 270 may be communicatively coupled to the application suite 246 and application monitoring module 268 via a bus 208 or may be directly coupled to the application monitoring module 268 via a dedicated connection. Each of the application monitoring module 268 and DSCP network filtering module 228, as well as other modules described herein may be executed by the processor 202 according to the principles described herein.

As the OS 270 relays the data descriptive of the type of data traffic to be transmitted across a communication network by any of a plurality of applications to the DSCP network filtering module 228, the DSCP network filtering module 228 may rank the plurality of applications being executed by the processor 202 based on prioritization criteria described herein. The prioritization data may be predefined by an IT manager that causes the DSCP network filtering module 228 to rank the data traffic based on, for example, a level of QoS to be applied to the data traffic, security level data descriptive of the level of security to be applied to the data being transmitted, the amount of data traffic to be transmitted, or any other QoS metrics including, but not limited to, acceptable levels of packet loss, bit rates, throughput, acceptable levels of transmission delays, availability of the RF spectrum and bandwidth, acceptable levels of data security, and acceptable levels of jitter. As described herein, an example ranking of different types of data traffic is presented in Table 1 herein but may be adjusted by an IT manager in order to achieve a mode of operation of the information handling system 200 while transmitting data over the communication network.

In a specific embodiment, a gaming application 262 may be executed by the processor 202 on the information handling system 200. The gaming application 262, during execution, may produce video data during the execution of a graphical processing unit (GPU) 203, voice-over-internetprotocol (VOIP) data received at a microphone (not shown), and input/output (I/O) data, among other types of data. In this example, the desktop DSCP network filtering module 228 may provide certain guaranteed QoS bandwidth levels, latency levels, packet loss levels, bit rate levels, throughput levels, transmission delay levels, data security levels, and jitter levels among other QoS criteria. The DSCP network filtering module 228 does this by assigning, in this example, the I/O data, the VOIP data, and the video data to different network slices that may use different RF spectrums to send the data to the backend server 286. During execution of the gaming application 262, the video data, for example, may be provided a network slice that has a QoS level that includes high bandwidth, low jitter, low packet loss, low transmission delay, and low security. This is because a user may notice, visually, a drop in the production of video at the information handling system 200 received or sent to the backend server 286. As such, the video data may be given, according to Table 1, a medium priority.

The DSCP network filtering module 228 may also look for data from the spectrum query module 230. The spectrum query module 230 may upon execution by the processor 202, determine which of a plurality of wireless communication spectrums are available to communicatively couple the information handling system 200 to the backend server 286 for transmission of the data to be transmitted by each of the applications.

In an embodiment, the DSCP network filtering module 228 may operate at the network layer responsible for transmitting data packets from the information handling system 200 to the backend server 286 while the spectrum query module 230 operates at the data link layer. By assigning the data traffic to a specific licensed or unlicensed RF spectrum and a specific network slice at the network layer by the IDSCP network filtering module 228, the DSCP network filtering module 228 may use that information at a higher layer (e.g., the spectrum query module 230 operating at the data link layer) in the network stack to manage the QoS of any application being executed in the information handling system 200. In the case of the gaming application 262 and according to Table 1, the video data may be assigned to a network slice that includes any of an unlicensed or licensed RF spectrum. The I/O data from the execution of the gaming application 262 may also be sent over a network slice that that has low latency such that input from the user at a mouse or keyboard may be reflected at the graphical user interface presented on a screen of the information handling system 200. Because some gaming applications 262 use a microphone to transmit, in real-time, the voice of the user to potentially other users executing the same gaming application 262 this data may also be transmitted by the information handling system 200 to the backend server 286. This voice data may be transmitted by the information handling system 200 as VOIP data. According to Table 1, the VOIP data may be assigned to a network slice that includes a licensed RF spectrum. The VOIP data from the execution of the gaming application 262 may also be sent over a network slice that that has low latency such that the voice of the user may be presented, in real-time, to other users during game play.

The information handling system 200 may also include additional hardware that allows data to be shared among the various OSI model layers. In an embodiment, the information handling system 200 may include a network driver interface specification (NDIS) miniport bridge 274. The NDIS miniport bridge 274 may include an application programming interface (API) for network interface controllers (NICs) used to form a logical link control sublayer on the OSI data link layer so as to act as an interface between the media access control (MAC) sublayer in an embodiment. The NDIS miniport bridge 274 may be used to help transmit the data descriptive of the wireless communication spectrums available to the information handling system 200.

The information handling system 200, in an embodiment, may also include OS compatible kernel mode drivers 276. These OS compatible kernel mode drivers 276 may be used to manage access to the main memory of the information handling system 200 as well as other features. The OS compatible kernel mode drivers 276 may also include, in an embodiment, a Windows management instrument (WMI) to provide the OS 270 an interface through which components of the information handling system 200 provide information and notification to other components of the information handling system 200. In this example, the WMI may allow the DSCP network filtering module 228 to communicate with the spectrum query module 230.

As described herein, the information handling system 200 may further include a network interface device 280 such as a wireless adapter that allows the information handling system 200 to transmit data to an access point or other network device within the communication network. The network interface device 280 can provide connectivity to a network of which the backend server 286 is a part of. For example, the network may include a wide area network (WAN), a local area network (LAN), wireless local area network (WLAN), a wireless personal area network (WPAN), a wireless wide area network (WWAN), or other networks. Connectivity may be via wired or wireless connection. The network interface device 280 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one network interface device 280 may operate two or more wireless links.

The network interface device 280 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both licensed communication spectrum and unlicensed communication spectrums. For example, both WLAN and WWAN may use the Unlicensed National Information Infrastructure (U-NII) band. It is understood that any number of available channels may be available under various licensed and unlicensed frequency bands for wireless protocols and some bands for these protocols may be shared. As described herein, the spectrum query module 230 may determine which of the frequency bands (e.g., RF frequency bands) are available to the information handling system 100, either licensed or unlicensed, to transmit data across a communication network and to a backend server. The backend server 286 may include any type of server the information handling system 200 is attempting to communicate with for any purpose.

In an embodiment, a hardware bus driver 278 may be implemented. The hardware bus driver 278 may complete a number of functions including enumerating devices on the bus 208, responding to plug and play input/output request packets (IRPs) and power management IRPs, multiplex access to the bus 208, and/or generically administer the devices communicatively coupled to the bus 208 such as the network interface device 280.

After the DSCP network filtering module 228 has ranked the plurality of data types from the plurality of applications being executed by the processor based on prioritization criteria associated with data to be transmitted by each of the application and received the data from the spectrum query module 230 descriptive of the wireless communication spectrums that are available to communicatively couple the information handling system 200 to a backend server 286, the DSCP network filtering module 228 may assign a wireless communication spectrum to the data associated with any given application being executed by the processor according to the prioritization criteria and rank of the given application. In an embodiment, the DSCP network filtering module 228 may assign the wireless communication spectrum to the data by adding a tag or other indicator to a packet header used to transmit the data across the communication network. In this embodiment, the DSCP header created may include the DSCP tagging priority data described in connection with Table 1. In the specific example of the gaming application 262 described herein, the video data may be packeted using the packet processing module 272 with a header that includes a value of 0.02 indicative of a medium priority. Similarly, the VOIP data may be given a high priority in the DSCP header by including a 0.923431487 in the header. This process may be repeated using any type of data. The values assigned to tag the data packets as high, medium, or low, or any other intermediate priority may be selected by an IT administrator as an operational policy and may be used by other devices within the wireless communication network to determine the appropriate priority assigned to each data packet and stream so that the data is transmitted across the correct network slice and wireless communication network.

In an embodiment, as the packet processing module 272 packets each of the types of data, the packet processing module 272 may group similar priority packets together. For example, where multiple packets of video data are created and assigned a value as described herein, these multiple packets may be grouped together prior to transmission across the communication network using the network slice that provides the QoS commensurate with the priority assigned to the packets.

During operation, the packet processing module 272 may receive the data packets including the augmented DSCP headers from the DSCP network filtering module 228. The packet processing module 272 may then access the network interface device 280 to transmit the data packets to an access point 282 forming part of the communication network used to communicatively couple the information handling system 200 to the backend server 286. In an embodiment, each access point 282 or any other intermediate hardware used to transmit the data packets from the network interface device 280 to the backend server 286 may include a virtual server networking (VSN) module 284. The VSN module 284 may be executed by a processor on each access point 282 or any other intermediate hardware so that the packet headers may be deciphered and the packets forwarded onto the backend server 286 using the prioritization criteria reflected in the header of the packets.

The backend server 286 may be any type of server or group of servers that receive input from the information handling system 200 and provides output to the information handling system 200. In the example of the gaming application 262 being executed on the information handling system 200, the backend server 286 may be associated with a real-time online gaming community such that video data, I/O data, and VOIP data presented to the backend server 286 form the information handling system 200 is shared with a community of gamers also operating the gaming application 262 in real-time. Other backend servers may include email servers, messaging servers, video content providers, internet web application servers, or the like. Although specific examples of operation of the information handling system 200 are described herein, the present specification contemplates that any data originating from any executed application may be transmitted to a backend server via the systems and methods described herein. It is further contemplated that other types of data may not be transmitted on the same network slice based on their differences in type of data traffic and the priority of that data traffic assigned by the DSCP network filtering module 228. In an embodiment, the exchange of communications via any connection between the information handling system 200 and the backend server utilizing a network slice may be similar to conventional network slice communication exchanges, with the exception of that multiple applications operating on the information handling system 200 may be exchanging communications via their respective connections with their respective network slices that each include respective networking characteristics that satisfy the networking connectivity requirements of those applications. As discussed below, each of the network slices provided over the communication network are isolated from each other and, as such, any application or workload that is operating on the information handling system and that is utilizing a particular network slice will be unaware of the other networks available via the other network slices being utilized by other applications or workloads operating on that same information handling system 200.

Figure 3:
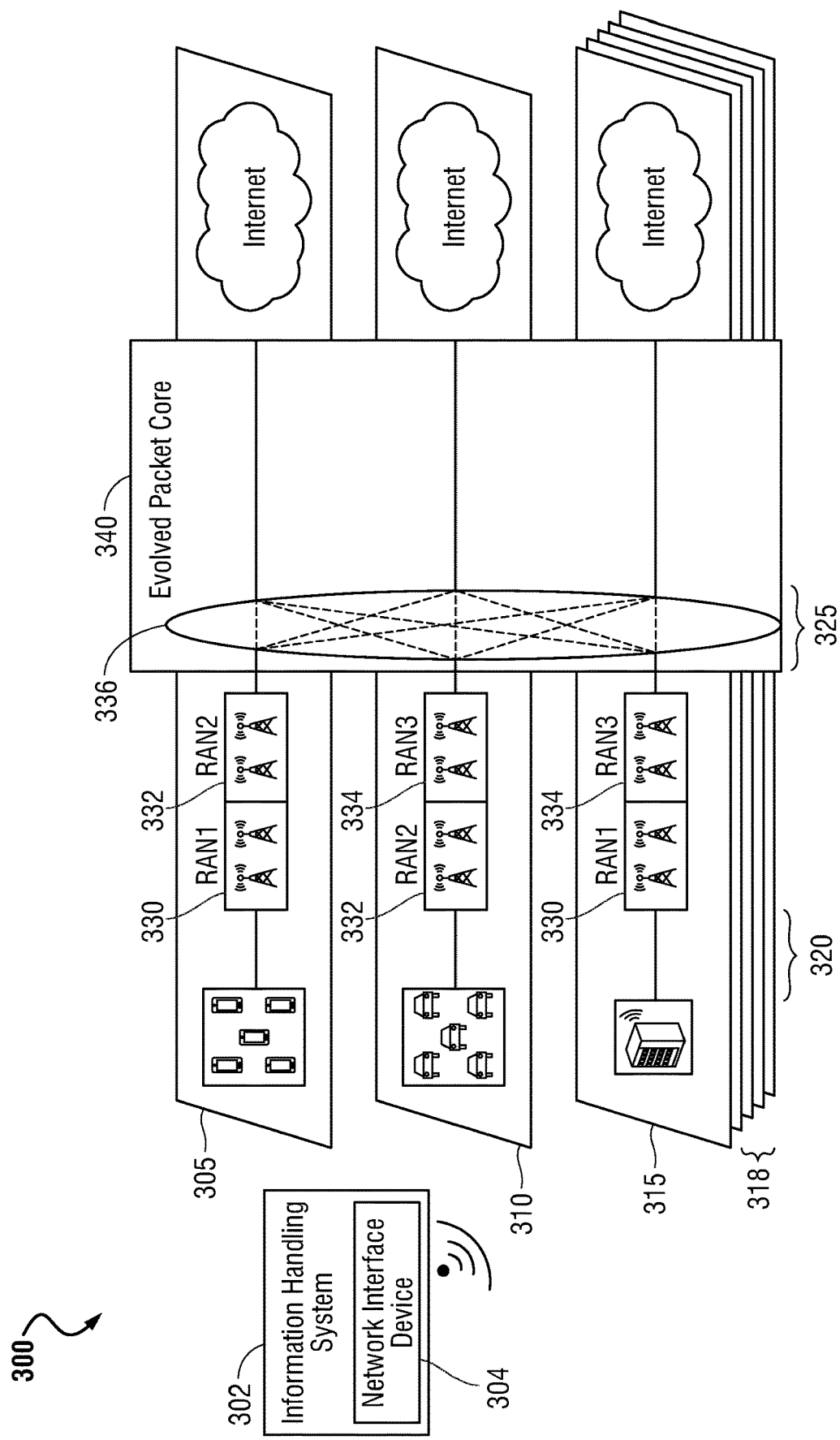
FIG. 3 is a block diagram of an information handling system communicatively coupled to a sliced communication network according to an embodiment of the present disclosure.

FIG. 3 is a block diagram of an evolved packet core 340 within a sliced network 300 according to an embodiment of the present disclosure. The evolved packet core (EPC) 340 described herein may be any framework that provides the data traffic pf various types of data described herein to be transmitted on a 4G or 5G long-term evolution (LTE) network or other types of networks that may form part of or are ancillary to such an LTE, or other network. In an embodiment, the EPC 340 may include a mobility management entity (MME) that manages session states and authenticates and tracks data packets sent by the information handling system over the communication network. In an embodiment, the EPC 340 may also include any serving gateway to route data packets through the communication network. In an embodiment, the EPC 340 may include a packet data node gateway that acts as an interface between the LTE network and other data packet networks so that the management of the QoS (e.g., as indicated by the virtual server networking (VSN) module 284 in FIG. 2) and data packet inspection is completed from access point to access point within the communication network. In an embodiment, the EPC 340 may also include policies to support data packet flow detection, policy enforcement per the prioritization criteria in the DSCP headers and the VSN modules.

In this embodiment, the evolved packet core 340 may be communicatively coupled to the network interface device as shown in FIG. 2. As described herein, the evolved packet core 340 may be the logical backbone for providing voice and/or data on the communication networks associated with the evolved packet core 340. In an embodiment, the evolved packet core 340 may manage 3GPP functions and routing as well as maintain 3GPP-specific database contents and is extended to other wireless network systems such as WiFi, IoT protocols or the like. In a specific embodiment, the evolved packet core 340 may receive instructions from the VSN module (e.g., VSN module 284 of FIG. 2) to determine how to send the data packets across the communication network using any of the available network slices 305, 310, 315, and 318 using their respective RF spectrums to do so.

As described herein, the sliced network 300 may be sliced using, for example, a network slicing module. The network slicing module may implement one or more of a vertical network slicing or a horizontal network slicing process. These two different processes may be implemented to, respectively, allow for resource sharing between different applications executed by the information handling system to enhance quality of service (QoS) and allow for resource sharing among different network nodes to enhance the capabilities of less capable network nodes. In a specific embodiment, the sliced network may allow for specific types of data, as indicated in the DSCP headers, to be transmitted across the communication network based on the type of data being transmitted. In an embodiment, each network slice 305, 310, 315 may be optimized to provide the required resources and QoS to meet the diverse set of requirements for each service.

By way of example, a first network slice 305 may be relegated to a mobile broadband slice. In this embodiment, the first network slice 305 may virtually separate those processes associated with the mobile broadband processes to optimize the operational processes so that these processes may be made more streamlined. Similarly, a second network slice 310 may be virtually separated to include those mission critical autonomous driving operations associated with self-driving vehicles. The autonomous driving operations may include large amounts of data transmissions that allow a vehicle to drive with no human interaction. The formation of this second network slice 310, therefore, allows the sliced network 300 to have high throughput, high bandwidth, and low latency resources available to conduct these operations without damage to property or harm to humans. Additionally, the sliced network 300 may include a third network slice 315 that is associated with operations related to IoT devices and their operations. In this example, the third network slice 315 may optimize those processes associated with the operation of those IoT devices that may, for example, require low latency.

Continuing with the gaming application example presented herein, a plurality of slices virtually formed within the sliced network 300 may be associated with the operations of various data types from a specific application such as a gaming application being executed at the information handling system 302 in an example embodiment. This is done such that transmission of video data, VOIP data, and I/O data, among other types of data, may each be transmitted over those network slices 305, 310, 315, and 318 that would provide certain levels of quality of service that include as acceptable levels of packet loss, bit rates, throughput, acceptable levels of transmission delays, availability of the RF spectrum and bandwidth, acceptable levels of data security, and acceptable levels of jitter, among others for the various types of data from the specific application.

In a further example, a plurality of slices virtually formed within the sliced network 300 may be associated with the operations of a videoconferencing application being executed at the information handling system 302. This is done such that transmission of video data, VOIP data, and I/O data, audio data, and message data, among other types of data, may each be transmitted over those network slices 305, 310, 315, and 318 that would provide certain levels of quality of service that include as acceptable levels of packet loss, bit rates, throughput, acceptable levels of transmission delays, availability of the RF spectrum and bandwidth, acceptable levels of data security, and acceptable levels of jitter, among others.

In an embodiment, any number of radio access networks 330, 332, 334 may be used to communicatively couple each of the endpoint devices (e.g. information handling system 302) to the evolved packet core 340 via a fronthaul 320 portion of the communication network architecture. The evolved packet core 340 may be any device or devices that execute instructions, parameter, and profiles so that voice and data communication requests from the endpoint devices may be received and routed to a communication network as described herein. The execution of the evolved packet core 340 may serve as a gateway for the endpoint devices to be communicatively coupled, for example, to a private LTE communication network, a public WiFi communication network, a private WiFi communication network, a 4G LTE public communication network, or a 5G millimeter-wave (mm-wave) communication network, among other types of public and private communication networks. The allocation and, in some examples, reallocation of the assignment of any given information handling system 302 to a specific communication network may be dependent on a number of characteristics related to the information handling system 302 that include the applications being executed on the information handling system 302. In a specific embodiment, the type of data being transmitted across the evolved packet core 340 by any given information handling system 302 indicates the allocation and, in some examples, reallocation of the assignment of any given information handling system 302 to a specific communication network. In an embodiment, the sliced network 300 may include a backhaul or any other portion of the communications network that includes intermediate links between the evolved packet core 340 and the radio access networks 330, 332, 334. The data packets may be routed across, for example the internet to a backend server according to the embodiments described herein.

In an embodiment, the evolved packet core 340 may execute a communication network discovery module in order to provide data descriptive of the available RF spectrums and network slices available to the information handling system 302 via the communication network. In an embodiment, the available RF spectrums and network slices may be those RF spectrums and network slices associated with any type of communication such as licensed spectrums that include those spectrums associated with a public LTE communication network 144, private LTE communication network 142, 5G NR cellular, a citizens broadband radio service (CBRS), or any other communication network that is regulated by a governmental agency such as the FCC or FIG. 3 shows that different types of information handling system 302 which may be used in connection with the systems and methods described herein may be varied. In any embodiment described herein, the information handling system 302 may include a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a personal trusted device, a web appliance, or any other suitable machine capable of executing a set of instructions (sequential or otherwise) that specify actions to be taken by that machine, and can vary in size, shape, performance, price, and functionality. The present specification contemplates that these different types of information handling systems 302 may each produce, based on their use by a user, specific types of data or a plurality of different types of data. For example, where the information handling system 302 is a self-driving vehicle, the type of data transmitted may include video data, real-time GPS data, and sensor data, among other types of data related to the operation of a self-driving vehicle. Additionally, where the information handling system 302 is a smartphone, even more types of data may be produced dependent on the type of applications being executed either in the background or activated by a user. Again, each of these types of data may be assigned by a DSCP network filtering module to be transmitted across a different network slice 305, 310, 315, and 318.

Figure 4:
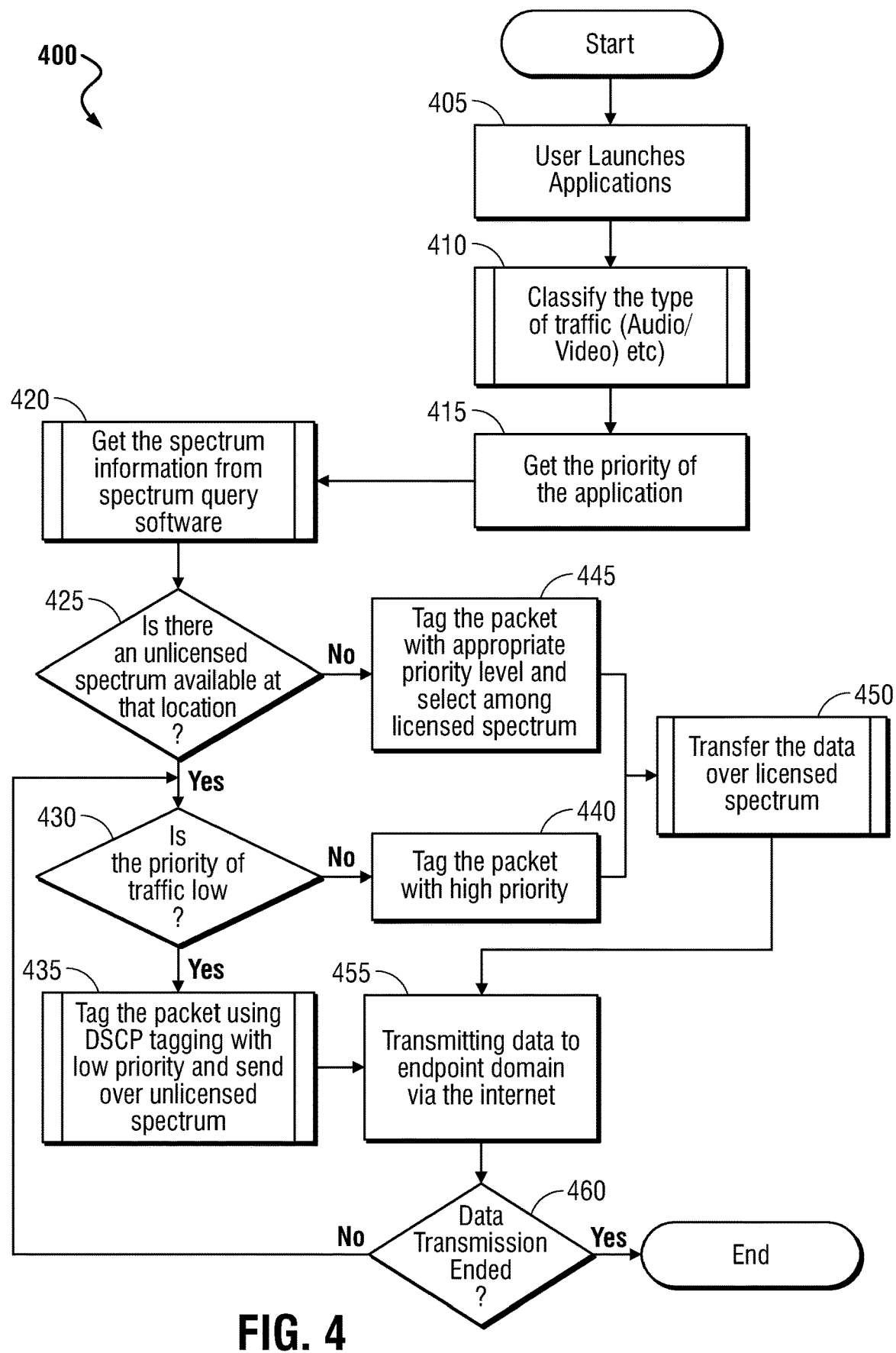
FIG. 4 is a flow diagram illustrating a method of communicating data across a wireless communication network according to an embodiment of the present disclosure.

FIG. 4 is a flow diagram illustrating a method 400 of communicating data across a wireless communication network according to an embodiment of the present disclosure. The method 400 may begin with a user launching one or more applications on the information handling system at block 405. In an embodiment, an application being launched may be an application that is operated in the background and executed with little to no user intervention or input. In an embodiment, this background application being executed may not include a user interface but still requests and causes data to be sent across the communication network as described herein. Example background applications may include an antivirus application, an OS updating program, or any other software updating service. The user may launch such a background application by activation of an on switch of the information handling system. The application may also be an application launched by a user via, for example, the actuation of an icon presented to a user on a graphic user interface at a screen of the information handling system. In an embodiment, each time an application is launched or closed, an application monitoring module may detect these launches and closings for use during execution of the method 400 described herein.

In an embodiment, another application being launched may be an application that is executed by a user by, for example, interfacing with a graphical user interface to cause executable code to be executed by a processor of the information handling system. Examples of these types of applications may include a word processing application, data (e.g., video and/or audio data) streaming application, a videoconferencing application, a spreadsheet application, an email application, a browser application, a file hosting application, a gaming application, a desktop publishing application, and an audio/video application. Each of the background applications and executable applications described herein may produce various different types of data such as video data, VOIP data, I/O data, audio data, file sharing data, browser data, among other types of data including those described in Table 1.

The method 400 may continue, at block 410, with classifying the type of data traffic created by the launched applications. This classification may be completed using an application monitoring module by monitoring for data descriptive of the type of data traffic to be transmitted across a communication network by any of a plurality of applications being executed on the information handling system. The classification of the data may be based on the data provided within, for example, Table 1 in the form of a look-up table maintained on the information handling system. Table 1 may be used to which data is, for example, video data, VOIP data, background data, best effort data (e.g., data transmission not guaranteed at a certain level of QoS), browser email data, and browser news and other data. In some embodiments, the classification of the application producing the data may be determinative of the type of data while in other cases the application may serve as an indication as to what type of data the application may produce. Although the present embodiments describe specific methods and processes to develop the classifying criteria, the present specification contemplates that data may be classified using various methods and the assignment of the priority may be accomplished in a static way.

The method 400 may continue by getting or determining a priority of the application and, accordingly the one or more various types of data produced by the application at block 415. In this embodiment, Table 1 may again be referenced by noting that certain types of data may be assigned a level of priority such as High, Medium, and Low priorities. Although only three classifications have been presented herein, the present specification contemplates that more or fewer levels of prioritization may be used without going beyond the scope of the principles described herein. The prioritization of the traffic data and the application that produced it may be accomplished via execution of the DSCP network filtering module by a processor. Additionally, as described herein, the prioritization criteria used to prioritize the applications and their respective data may be set by an IT administrator prior to execution of the systems and methods described herein. Based on the prioritization of the applications being executed, the DSCP network filtering module may also rank the plurality of applications being executed by the processor or rank various data types generated or required by one or more applications based on prioritization criteria associated with data to be transmitted by each of the applications.

The prioritization and ranking of the applications at block 415 may be completed at any point during the execution of the method 400 which point of time may also be set by the IT administrator. As described herein, each time an application is launched or closed, an application monitoring module may detect these launches and closings for use during execution of the method 400 described herein. Additionally, in an embodiment, the prioritization and ranking of the applications may be completed multiple times or continuously as the applications are executed. Each time the prioritization and ranking of the applications at block 415 is completed, a new ranking of the currently executed applications is provided. The rankings of the applications based on the data presented in Table 1 may be fluid and change when the set of applications running (and communicating with the application monitoring module) changes causing resetting of the dynamics of Table 1. This may cause the method 400 to again receive data from the new set of executed applications so that a continuous and iterative monitoring of the executed applications by the application monitoring module is completed. This causes block 415 to iteratively be executed such that the DSCP network filtering module again determines a priority of the application and, accordingly the one or more various types of data produced by the applications.

In an embodiment, the user may launch, for example, a gaming application at block 405. In this embodiment, the method 400 may classify, at block 410, each type of data created by the execution of the gaming application. These types of data may include video data, audio data, synching data, and input-output (I/O) data, among others. The method 400 includes classifying these different types of data based on, for example, the information presented in Table 1. With the classification of the data completed at block 410, the method 400 may further include ranking the priority of the plurality of applications being executed by the processor at block 415 with the gaming application being one such ranked application. Table 1 may again be referenced by noting that certain types of data may be assigned a level of priority such as High, Medium, and Low priorities which may influence the ranking of the application and, accordingly, its data. In the example of the gaming application, the video data may be ranked as "medium" priority and any VOIP data (e.g., data from a microphone) may be ranked as "High" priority due to protection of personal communications during gaming and I/O gaming input data such as a controller or keyboard input may be ranked according to bandwidth and latency needs, for example "medium". If a gaming application requires high bandwidth for video data communications to avoid lag or provide quick responses to a gaming experience, a "high" priority level may be assigned to such data which similar audio data received may not require a much bandwidth and may be provided a "medium" priority level if it does not contain personal information of discussion. Other types of data for communication by the gaming application may fall under any of the various types of data categories and may be similarly ranked according to policy settings.

In an embodiment, the user may launch, for example, a browser application. Browser applications, in some embodiments, have the capability of executing multiple tabs with each tab accessing data or sending data to different backend servers. For example, one tab of the executed browser application may be accessing an online video sharing website while another may be accessing a collaborative online encyclopedia website. Accessing the video sharing website via the browser application may cause video data to be received from (and sometimes sent to) the backend server of the online video sharing website. Accessing the collaborative online encyclopedia website via the browser application may cause text data to be received from (and sometimes sent to) the backend server of the online encyclopedia website. In this embodiment, the video data received by the online video sharing website may be assigned a medium priority while the text data from the online encyclopedia website may be assigned a low priority based on that data being classified as "Browser (news/other) data" as indicated in Table 1. The priority assigned to the application at block 415 may be based on these types of data being transmitted. In an embodiment, the priority assigned to the browser application may be medium based on the video data having a medium priority even when other lower priorities of data are being sent/received by the browser application. In one embodiment, the average of the priority of the data classified at block 410 may define the priority of the application when each application is assigned a priority level. In other embodiments, each data type from an application may have a policy-based priority setting such as determination of the type of information being utilized by a browser application. For example, a web-based teleconferencing system may be utilized via a web browser application, but may be assigned the same high priority level as a video conferencing application operating on the information handling system. The application monitoring module may discern the types of data being utilized or generated on applications executing on the information handling system to provide for ranking identification and assessment by the DSCP network filtering module. So, in accordance with Table 1, a browser application, or any executing application, may fall under multiple prioritization levels depending on the type of data being utilized in network communications for that application. It is understood that Table 1 shows on a limited embodiment example set of prioritization tagging levels and such prioritization policy levels may also change depending on the applications operating at a given time, types of data for network communications that may arise, spectrum or bandwidth available, or other factors.

The method 400 may also include receiving spectrum information from the spectrum query module at block 420. As described herein, the spectrum query module may perform tasks related to determining which of a plurality of wireless communication spectrums are available to communicatively couple the information handling system to a backend server for transmission of the data to be transmitted by each of the applications. The spectrum query module may receive data from the DSCP filtering module indicating which QoS criteria to discover in the various RF spectrums available to the information handling system to transmit data. In an embodiment, the spectrum query module may send data descriptive of the available RF spectrums provided across a sliced network available to transmit any type of data (e.g., video, audio, email data among other types of data). The data obtained and sent to the DSCP network filtering module by the spectrum query module may include descriptions of real-time QoS availability at the RF spectrums and network slices on the communication network.

The method 400 may then continue with determining, at block 425, whether an unlicensed spectrum is available at the location where the information handling system is present. By way of example, an unlicensed communication spectrum may include those spectrums associated with private or public Wi-Fi communication networks 134, 5G communication networks, WiGig communication networks, citizens broadband radio service (CBRS) network, and small cell WLAN communication networks in an unlicensed, shared communication frequency band. Especially in the case of those unlicensed spectrums associated with 5G communication networks, those applications that produce data traffic that requires a high throughput and a sufficient level of bandwidth may use the 5G communication networks in some embodiments. Where there are no unlicensed spectrums available (NO determination, block 425), the method 400 may continue with tagging the data packets with an appropriate priority level and selecting among the licensed spectrums discovered by the spectrum query module at block 445. In an embodiment, where the type of data being transmitted is video data from a gaming application, according to a policy such as Table 1 and where no unlicensed spectrums available (NO determination, block 425) to the information handling system, the video data is tagged as having a medium priority. In an embodiment, where the type of data being received is news or text data from a browser application, according to Table 1 and where no unlicensed spectrums available (NO determination, block 425) to the information handling system, the video data is tagged as having a low priority. In any embodiment, where no unlicensed spectrum is available, all data may be assigned their respective priorities according to Table 1, and transferred over the wireless communication network via a licensed spectrum at block 450. In an embodiment, where data is indicated as only transmissible over a licensed spectrum, that data may be prevented from being transmitted over an unlicensed spectrum and only transmitted when the spectrum query module detects a licensed spectrum is available to the information handling system. If multiple licensed spectrum options are available, selection among licensed spectrum may be based on bandwidth, congestion, wireless quality and other factors in determining which data types are correlated with the multiple available licensed wireless spectrum options.

In an embodiment, the DSCP network filtering module and a DSCP header may be used to tag the data packets at block 445. The method 400, in some embodiments, may include transferring (block 450) the data traffic over a licensed spectrum such as spectrums associated with a public LTE communication network 144, private LTE communication network 142, 5G NR cellular, a citizens broadband radio service (CBRS), and transmitting the data traffic to an endpoint domain via the internet at block 455. The data may be transferred over a licensed spectrum using a network interface device as described herein. Additionally, the endpoint domain may include that hardware and software such as a backend server that allows the data from the information handling system to be processed and, in some examples, output sent back to the information handling system.

Where there is an unlicensed spectrum available (YES determination, block 425), the method 4000 may continue at block 430, with determining whether the data traffic has been assigned a low priority by the DSCP network filtering module as described herein. Again, the assignment of the low priority may be done based, in and example, on the data presented on Table 1 herein. Where the priority of the data traffic is not low (NO determination, block 430), the DSCP network filtering module may tag the data packet with a high priority, transferring the data traffic over a licensed spectrum at block 450, and transmitting the data traffic to an endpoint domain via the internet at block 455. Where the priority of the data traffic is low (YES determination, block 430), the method 400 may continue with the DSCP network filtering module tagging the data packet with a low priority and sending the data packet over an unlicensed spectrum at block 435. Tagging of the data packets as high, low, or medium includes adding a value to a DSCP header via the DSCP network filtering module. In an example, the value added to the header may include a "high" value of 0.923431487, a "medium" value of 0.02, or a "low" value of any number less than 0.02, accordingly. At this time, the method 400 may include transmitting the data traffic to and endpoint domain via the internet or network intranet at block

455. The transmission of the data traffic and their individual packets is completed by passing the data packets from the information handling system to various network devices within the wireless communication network to the backend server. The DSCP header with its tag value may be passed to any individual network device and the network device may read the tag value. Upon reading the tag value, the network device may interpret the tag value and cause the data packet to be sent on the same RF spectrum and network slice as indicated by the DSCP network filter module. In an embodiment, a network interface device may communicate with any network device that, in an embodiment, operates a VSN module that reads the DSCP header. In this embodiment, the VSN module may be specifically used to specifically transmit the data packets over the communication network using the network slice and RF spectrum so tagged in the DSCP header.

Once the data has been transmitted to an endpoint domain via the internet at block 455, the method 400 may determine whether the data transmission has ended at block 460. The data transmission may end when a header of any given data packet so indicates, for example. In an embodiment where the DSCP operates at a network layer each data packet may be checked on a packet-by-packet basis to make a decision as to whether the packet can or should be transmitted. Where the data transmission has not ended (NO determination, block 460), the process may continue, in an embodiment, back at block 430 to determine whether the data traffic has been assigned a low priority by the DSCP network filtering module as described herein. The method 400 may continue from block 430 to, again, either tagging the data packet with a high priority (e.g., block 440) or a low priority (e.g., block 435). In an alternative embodiment, when the data transmission has not ended (NO determination, block 460), the process may continue back at block 425 with determining whether an unlicensed spectrum is available at the location where the information handling system is present. In some instances, the physical location of the information handling system may change while the method 400 is being executed or new unlicensed or licensed spectrums may be discovered by the spectrum query module. To provide the most beneficial spectrum to the information handling system, the method may determine whether any new spectrums are available before assigning a priority to the data packets being sent out at blocks 440, 445, 435, or 450 as described herein. Where the data transmission has ended (YES determination, block 460), the method 400 may end.

Figure 5:
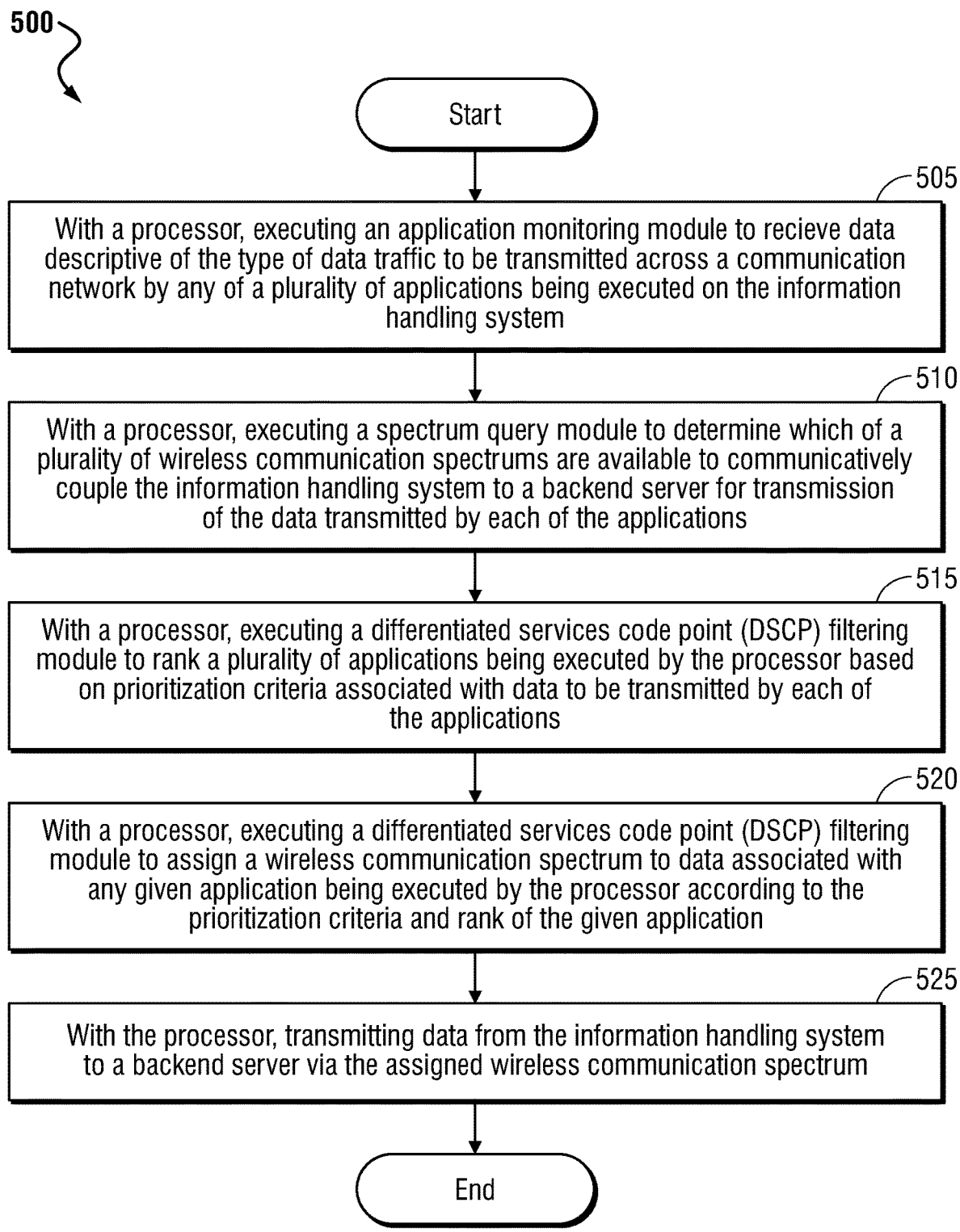
FIG. 5 is a flow diagram illustrating a method of communicating data across a wireless communication network according to another embodiment of the present disclosure.

FIG. 5 is a flow diagram illustrating a method 500 of transmitting data across a computer network according to an embodiment of the present disclosure. The method 500 may include, at block 505, executing an application monitoring module to receive data descriptive of the type of data traffic to be transmitted across a communication network by any of a plurality of applications being executed on the information handling system with a processor. As described herein, an application monitoring module may be used to communicate this data to a DSCP network filtering module via an operating system of the information handling system. In an embodiment, this process may be conducted by the DSCP network filtering module that forms part of the network layer within the information handling system. In an embodiment, by operating the DSCP network filtering module at the network layer, the DSCP network filtering module may have access to the hardware and software systems including applications executing on the information handling system such that the DSCP network filtering module may communicate those applications to survey or determine which are active and the types of data to be generated from those applications. Further, the DSCP network filtering module may communication with other modules of the information handling system such as the application monitoring module and a spectrum query module in various embodiments.

The method 500 may continue by, with the processor, executing a spectrum query module to determine which of a plurality of wireless communication spectrums are available to communicatively couple the information handling system to a backend server for transmission of the data to be transmitted by each of the applications. As described herein, the spectrum query module may provide, to the DSCP network filtering module, a list of licensed communication spectrums and unlicensed communication spectrums and network slices available to the information handling system to transmit data across the communication network. By way of example of an unlicensed communication spectrum may include those spectrums associated with private or public Wi-Fi communication networks, 5G communication networks, WiGig communication networks, citizens broadband radio service (CBRS) network, and small cell WLAN communication networks in an unlicensed, shared communication frequency band. Example communication frequency bands may include unlicensed 5 GHz frequency bands or 3.5 GHz conditional shared communication frequency bands under FCC Part 96, various 5G spectrum bands that operate in FR1 (sub-6 GHz) or FR2 (>5 GHz) bands, Wi-Fi ISM frequency bands that could be subject to future sharing include 2.4 GHz, 60 GHz, 900 MHz or similar bands as understood by those of skill in the art. Within a local portion of the communication network the information handling system is communicatively coupled to, access points for Wi-Fi or WiGig as well as small cell WWAN connectivity may be available in emerging 5G technology. By way of example, a licensed spectrum may include those spectrums associated with a public LTE communication network, private LTE communication network 142, 5G NR cellular, a CBRS, or any other communication network that is regulated by a governmental agency such as the FCC.

The method 500 may further include, at block 515, executing the DSCP network filtering module to rank a plurality of applications being executed by the processor based on prioritization criteria associated with data to be transmitted by each of the applications via execution of the processor. The ranking of the applications may be completed via reference to a look-up table or other reference such as Table 1 to determine the prioritization criteria associated with each of the data types and their respective applications. For example, the prioritization and ranking of the applications may be completed at any point during the execution of the method 500 which point of time may also be set by the IT administrator. Additionally, in an embodiment, the prioritization and ranking of the applications may be reassessed multiple times or continuously as the applications are executed and some come online while others are closed down or data types requested or made ready for communication change during operation of the applications.

In an embodiment, the user may launch, for example, a gaming application. In this embodiment, the method 500 may have classified each type of data created by the execution of the gaming application. These types of data may include video data, audio data, synching data, and input-output (I/O) data, and VOIP communications, among others. The method 500 includes classifying these different types of data based on, for example, the information presented in Table 1. With the classification of the data completed, the method 500 ranks the priority of the plurality of applications being executed by the processor at block 515 with the gaming application being one such ranked application. Table 1 may again be referenced by noting that certain types of data may be assigned a level of priority such as High, Medium, and Low priorities which may influence the ranking of the application and, accordingly, its data. In the example of the gaming application, the video data may be ranked as "medium" priority and any VOIP data (e.g., personal communication data from a microphone) may be ranked as "High" priority but may not always be utilized during gaming, while any of the various types of data such as I/O data for controllers or keyboards or audio data may be similarly ranked according to policy such as the example of Table 1. Such data may then be tagged with the priority in a data header for utilization with a corresponding network slice.

In an embodiment, the user may launch, for example, a browser application. Browser applications, in some embodiments, have the capability of executing multiple tabs with each tab accessing data or sending data to different backend servers. For example, one tab of the executed browser application may be accessing a video teleconferencing website, another may access an online video sharing website, while another may be accessing a collaborative online encyclopedia website. Accessing the video teleconferencing website via the browser application may cause video and audio data with personal or private communications to be received from (and sometimes sent to) the backend server of the online video conferencing website. Accessing the video sharing website via the browser application may cause video data to be received from (and sometimes sent to) the backend server of the online video sharing website. Accessing the collaborative online encyclopedia website via the browser application may cause text data to be received from (and sometimes sent to) the backend server of the online encyclopedia website. In this embodiment, the video data communicated by the online video conferencing website may be assigned a high priority, the video data received by the online video sharing website may be assigned a medium priority, and the text data from the online encyclopedia website may be assigned a low priority based on that data being classified as "Browser (news/other) data" as indicated in Table 1. In another embodiment, a web browser application accessing an online email website may be ranked with a high priority due to the risk of compromised private communications although the bandwidth, latency, and quality requirements may not be as substantial as a video data communication transfer. The rank assigned to the application at block 515 may be based on these types of data being transmitted. In an embodiment, the priority assigned to the tabs of the browser application may correspond to the priorities of data being sent/received by the browser application from each tab based on assessment by the application monitoring module. In these embodiments, higher priority data may be relegated to higher bandwidth that serves to transmit this more critical data potentially over multiple slices such that the QoS for this higher ranked data from the higher prioritized applications are realized. In some other embodiments, a highest level of classification of data from a particular application may define the priority of the application.

The method 500 may also include, at block 520, executing a differentiated services code point (DSCP) filtering module to assign a wireless communication spectrum to data associated with any given application being executed by the processor according to the prioritization criteria and rank of the given application via the processor. The assignment of the communication spectrum (and corresponding network slice in an embodiment) may be accomplished by the DSCP filtering module adding a DSCP tag to the header associated with the data being transmitted. The tag added to the DSCP header may be a value as represented in Table 1 that is indicative of a high, low, and medium prioritization of the data traffic. In an embodiment, classification allows the DSCP filtering module to determine the relative QoS to be provided to the data from each of the individual applications being executed and assign that data traffic to an appropriate RF spectrum and/or network slice. In an embodiment, the DSCP network filtering module may rank the data traffic based on, for example, a level of QoS to be applied to the data traffic, security level data descriptive of the level of security to be applied to the data being transmitted, the amount of data traffic to be transmitted, and any other QoS metrics including, but not limited to, acceptable levels of packet loss, bit rates, throughput, acceptable levels of transmission delays, availability of the RF spectrum and bandwidth, acceptable levels of data security, and acceptable levels of jitter. As described herein, an example ranking of different types of data traffic is presented in Table 1 herein but may be adjusted by an IT manager in order to achieve a mode of operation of the information handling system while transmitting data over the communication network. In an embodiment, the tag added to the DSCP header may be used later by other network devices used to transmit the data packets over the communication network. The tags indicate the priority of the data and, accordingly, the network slice used to transmit that data across the communication network. As each network device receives the DSCP header tag, it will forward the data packet on using the same network slice and RF spectrum as it was received on thereby ensuring a QoS across the communication network and to the backend server as described herein.

The method 500 may further include transmitting data from the information handling system to a backend server via the assigned wireless communication spectrum via execution of the processor. As described herein, the transmission of the data across the communication network may be accomplished by a packet processing module sending the filtered and tagged data packets to the network interface device. The network interface device may communicate with any access point that, in an embodiment, operates a VSN module that reads the DSCP header. In an embodiment, the VSN module may be specifically used to specifically transmit the data packets over the communication network using the network slice and RF spectrum so tagged in the DSCP header. The tagged DSCP header may also be used for routing the data packet through the network based on network congestion, traffic levels, delay/return levels and other factors so as to deliver the data communications via a specific network slice based on the priority tags. At this point, the method 400 may end.

The blocks of the flow diagrams of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system, comprising:
   a processor;
   a memory;
   an application monitoring module configured to, upon execution of code instructions by the processor, receive data descriptive of the type of data traffic to be transmitted across a wireless communication network by any of a plurality of applications being executed on the information handling system;
   the processor executing code instructions of a spectrum query module configured to determine which of a plurality of wireless communication spectrums are available to communicatively couple the information handling system to a backend server for transmission of the data to be transmitted by each of the applications; and
   the processor executing code instructions of a differentiated services code point (DSCP) filtering module configured to:
      rank a plurality of data types of the applications being executed by the processor based on prioritization criteria associated with data to be transmitted by each of the application;
      assign a wireless communication spectrum to a type of data associated with any given application being executed by the processor according to the prioritization criteria and rank of the given application wherein the plurality of wireless communication spectrums are separated into individual network slices to achieve a quality of service (QoS) commensurate with the prioritization criteria, wherein low priority data to be transmitted is assigned, by the DSCP filtering module, to an unlicensed wireless spectrum; and
   a network interface device to communicate the type of data on corresponding wireless communication spectrums for the individual network slices.

2. The information handling system of claim 1, wherein the prioritization criteria include data descriptive of the level of quality of service to be applied to the data being transmitted by each of the applications.

3. The information handling system of claim 1, wherein multiple data types originating from a single application is ranked by the DSCP filtering module and assigned to a plurality of network slices within plural wireless communication spectrums for transmission by the network interface device over the corresponding wireless communication spectrums.

4. The information handling system of claim 1, wherein the DSCP filtering module; is configured to add a tag descriptive of a priority level of the types of data to a DSCP header sent with individual types of data.

5. The information handling system of claim 1, wherein high priority data to be transmitted is assigned, by the DSCP filtering module, to a licensed wireless spectrum.

6. The information handling system of claim 1, wherein the DSCP filtering module creates a DSCP header designating the ranking of the type of data associated with a plurality of applications being executed by the processor for data communication.

7. The information handling system of claim 1, wherein the prioritization criteria include security level data descriptive of the level of security to be applied to the data being transmitted by each of the applications.

8. The information handling system of claim 1, wherein the spectrum query module communicates with a virtual server networking module to manage the transmission of the data throughout a computer network the information handling system is communicatively coupled to.

9. A method of transmitting data across a computer network, comprising:
   with a processor, executing an application monitoring module to receive data descriptive of the type of data traffic to be transmitted across a communication network by any of a plurality of applications being executed on the information handling system;
   with the processor, executing a spectrum query module to determine which of a plurality of wireless communication spectrums are available to communicatively couple the information handling system to a backend server for transmission of the data to be transmitted by each of the applications;
   with the processor, executing a differentiated services code point (DSCP) filtering module to:
      rank a plurality of data types of the applications being executed by the processor based on prioritization criteria associated with data to be transmitted by each of the applications;
      assign a wireless communication spectrum to a type of data associated with any given application being executed by the processor according to the prioritization criteria and rank of the given application; and
      add a tag descriptive of a priority level of the types of data to a DSCP header sent with individual types of data, wherein the tag designates the assignment of a licensed or unlicensed wireless communication spectrum for the individual types of data to be transmitted via the network interface; and
   with a network interface, transmitting the individual types of data from the information handling system to a backend server via the assigned wireless communication spectrum.

10. The method of claim 9, wherein the prioritization criteria includes data descriptive of the level of protection to be applied to the data being transmitted by each of the applications.

11. The method of claim 9, wherein the plurality of wireless communication spectrums are separated into individual network slices to achieve a quality of service (QoS) commensurate with the prioritization criteria.

12. The method of claim 9, wherein the DSCP filtering module assigns low priority data to be transmitted across an unlicensed wireless spectrum.

13. The method of claim 9, wherein the DSCP filtering module assigns high priority data to be transmitted across a licensed wireless spectrum.

14. The method of claim 9, wherein the spectrum query module communicates with a virtual server networking module to manage the transmission of the data throughout a computer network the information handling system is communicatively coupled to.

15. The method of claim 9, wherein the prioritization criteria include security level data descriptive of the level of security to be applied to the data being transmitted by each of the applications.

16. The method of claim 9, wherein the spectrum query module communicates with a virtual server networking module to manage the transmission of the data throughout a computer network the information handling system is communicatively coupled to.

17. An information handling system communicatively coupled to a communication network, comprising:
   a processor;
   a memory;
   an application monitoring module configured to, upon execution of code instructions by the processor, receive data descriptive of the type of data traffic to be transmitted across a communication network by any of a plurality of applications being executed on the information handling system;
   the processor executing code instructions of a spectrum query module operating at a data link layer of the information handling system configured to determine which of a plurality of licensed and unlicensed wireless communication spectrums are available to communicatively couple the information handling system to a backend server for transmission of the data to be transmitted by each of the applications; and
   the processor executing code instructions of a differentiated services code point (DSCP) filtering module operating at the network layer of the information handling system configured to:
   rank a plurality of types of data of the applications being executed by the processor based on prioritization criteria associated with types of data to be transmitted by each of the applications, wherein the prioritization criteria includes data descriptive of the level of protection to be applied to the data being transmitted by each of the applications; and
   assign one of the licensed and unlicensed wireless communication spectrum to data associated with any given application being executed by the processor according to the prioritization criteria and rank of the given types of data of the application.

18. The information handling system of claim 17, wherein low priority data to be transmitted is assigned, by the DSCP filtering module, to an unlicensed wireless spectrum.

19. The information handling system of claim 17, wherein high priority data to be transmitted is assigned, by the DSCP filtering module, to a licensed wireless spectrum.

20. The information handling system of claim 17, wherein the plurality of wireless communication spectrums are separated into individual network slices to achieve a quality of service (QoS) commensurate with the prioritization criteria.

* * * * *